(12) United States Patent
Imai

(10) Patent No.: US 8,625,021 B2
(45) Date of Patent: Jan. 7, 2014

(54) IMAGE CAPTURE WITH REGION-BASED ADJUSTMENT OF IMAGING PROPERTIES

(75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 277 days.

(21) Appl. No.: 12/871,826

(22) Filed: Aug. 30, 2010

(65) Prior Publication Data

US 2012/0050565 A1    Mar. 1, 2012

(51) Int. Cl.
*H04N 5/225* (2006.01)

(52) U.S. Cl.
USPC ............... 348/342; 348/266; 348/333.12

(58) Field of Classification Search
USPC ............ 348/207.99, 224.1, 234, 333.01, 348/333.02, 362, 364, 222.1, 266–283, 348/335–340, 342, 333.12; 382/167, 294; 358/516; 257/446
See application file for complete search history.

(56) References Cited

U.S. PATENT DOCUMENTS

| | | | |
|---|---|---|---|
| 6,466,961 B1 | 10/2002 | Miller | 708/816 |
| 2002/0012064 A1* | 1/2002 | Yamaguchi | 348/362 |
| 2002/0141639 A1* | 10/2002 | Steinberg | 382/167 |
| 2003/0016299 A1* | 1/2003 | Matsushima | 348/333.02 |
| 2003/0098922 A1 | 5/2003 | Barkan | 348/362 |
| 2004/0017594 A1* | 1/2004 | Suekane et al. | 358/516 |
| 2004/0125220 A1* | 7/2004 | Fukuda et al. | 348/234 |
| 2005/0134722 A1* | 6/2005 | Hofer | 348/364 |
| 2005/0270397 A1* | 12/2005 | Battles | 348/333.01 |
| 2006/0140510 A1* | 6/2006 | Wallace et al. | 382/294 |
| 2007/0206108 A1* | 9/2007 | Nozawa | 348/333.01 |
| 2007/0291152 A1* | 12/2007 | Suekane et al. | 348/333.02 |
| 2008/0303913 A1* | 12/2008 | Mertens | 348/222.1 |
| 2010/0044822 A1* | 2/2010 | Longoni et al. | 257/446 |

OTHER PUBLICATIONS

F. Zaraga, et al., "White balance by tunable spectral responsivities", J. Opt. Soc. Am. A27, 31-39 (2010).
Boston Applied Technologies, Inc., "Focal Plane Array with Arbitrary Tunable Spectral Response", Air Force SBIR/STTR Innovation, (2009).
A. Longoni, et al., "The transverse field detector (TFD): a novel color-sensitive CMOS device", IEEE Electron Device Letters, 29, pp. 1306-1308, (2008).
U.S. Appl. No. 12/772,841, filed May 3, 2010, Applicant: Francisco Imai.
U.S. Appl. No. 12/789,323, filed May 27, 2010, Applicant: Francisco Imai.
U.S. Appl. No. 12/789,334, filed May 27, 2010, Applicant: Francisco Imai.
U.S. Appl. No. 12/859,115, filed Aug. 18, 2010, Applicant: Francisco Imai.

* cited by examiner

*Primary Examiner* — Nelson D. Hernández Hernández
*Assistant Examiner* — Dennis Hogue
(74) *Attorney, Agent, or Firm* — Canon U.S.A., Inc., IP Division

(57) ABSTRACT

Image capture with an image capture device that includes an imaging assembly having a tunable spectral response. A default capture setting is applied to the imaging assembly. Preview image data of a scene is captured using the imaging assembly with the default capture setting. A user interface includes a preview image based on the captured preview image data of the scene. A user designation of a region of interest (ROI) in the preview image is accepted, and a user selection of a targeted imaging property for the ROI is accepted. A revised capture setting for the spectral responsivity of the tunable imaging assembly is computed, by revising the default capture setting based on the targeted imaging property for the ROI as selected by the user. The revised capture setting is applied to the imaging assembly. Image data from the imaging assembly is captured using the revised capture setting.

42 Claims, 8 Drawing Sheets

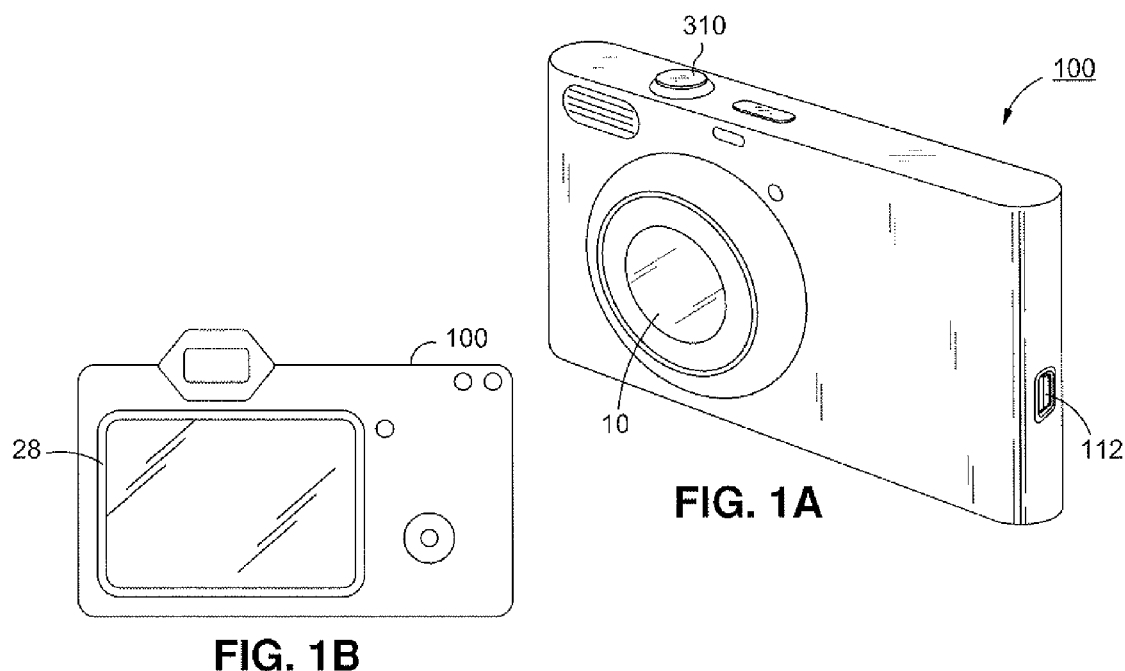
FIG. 1A
FIG. 1B
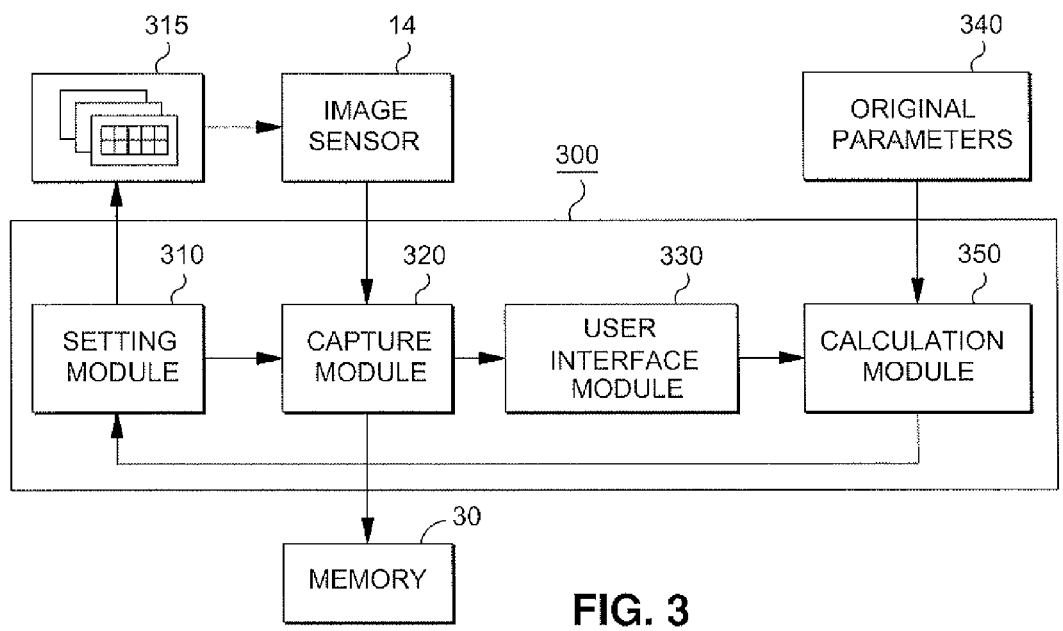
FIG. 3

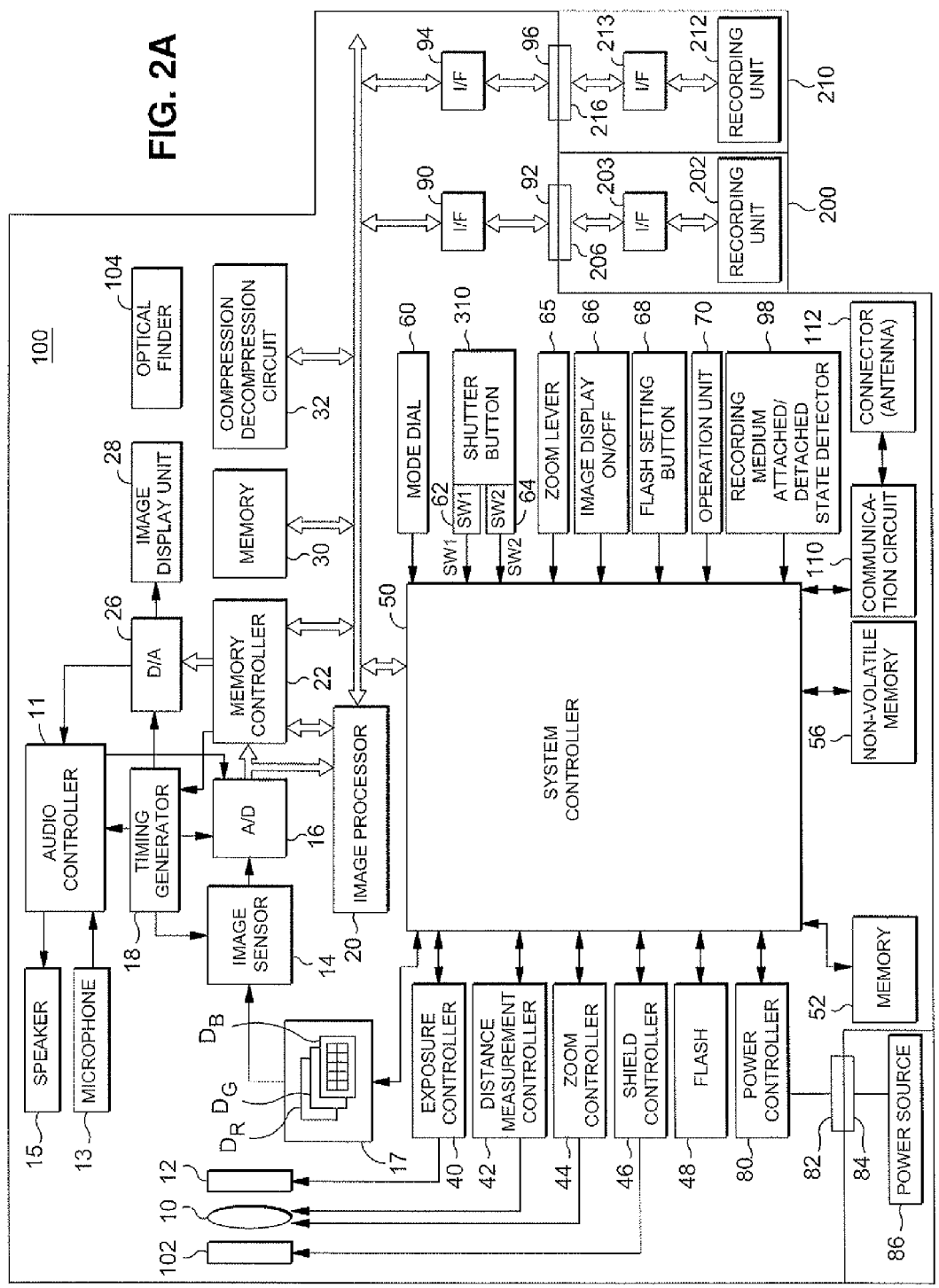

IMAGE CAPTURE WITH REGION-BASED ADJUSTMENT OF IMAGING PROPERTIES

FIELD

The present disclosure relates to image capture, and more particularly relates to adjustment of imaging properties for an image capture device.

BACKGROUND

In the field of photography, a photographer is often confronted with scenes that have extreme imaging properties, such as high dynamic range and unusual color balance. Dynamic range typically refers to a ratio between maximum and minimum values of physical measurement, and in photography specifically refers to a ratio of luminance values. Color balance typically refers to a comparative ratio of intensities of colors in an image.

Examples of scenes with extremes in imaging properties include scenes with high dynamic range or unusual color balance. In some cases, such a scene may have multiple different regions, each with different brightness levels or a different color balance. For example, a scene might include a first region depicting bright day light and a second region depicting dark shadow. In this situation, the first region depicting bright day light has a different brightness level and a different color balance than the second region depicting dark shadow.

When confronted with such a scene, the photographer is often compelled to capture many images of the scene, each with different exposure settings, such as shutter speed and/or color balance. Then in post-capture image processing, the photographer combines the images into an acceptable rendition of the scene. This acceptable rendition may not be achievable due to loss of information during capture, such as saturated channels, that cannot be easily estimated or reconstructed.

SUMMARY

Recently, imaging assemblies have been developed in which the imaging assemblies have a tunable spectral response. Two examples of such imaging assemblies are described here. In the first example of imaging assemblies which have a tunable spectral response, there are imaging assemblies where the image sensor itself has a tunable spectral response. For instance, there is an image sensor described in "The Transverse Field Detector: A Novel Color Sensitive CMOS Device", Zaraga, IEEE Electron Device Letters 29, 1306-1308 (2008) and U.S. Patent Publication No. 2010/0044822, the contents of which are incorporated herein by reference. These documents describe a transverse field detector (TFD) which has a tunable spectral responsivity that can be adjusted by application of bias voltages to control electrodes. Each pixel outputs signals for a red-like channel, a green-like channel, and a blue-like channel.

In some of these image sensors, the spectral responsivity is tunable on a pixel by pixel basis or a region-by-region basis. Bias voltages are applied in a grid-like spatial mask, such that the spectral responsivity of each pixel is tunable individually of other pixels in the image sensor, or such that the spectral responsivity of each region comprising multiple pixels is tunable individually of other regions in the image sensor.

In the second example of imaging assemblies which have a tunable spectral response, there are imaging assemblies where the image sensor is preceded by a color filter array (CFA), and it is the color filter array that has a tunable spectral response. In the first example described above, because the image sensor itself has a tunable spectral response, it might be customary to omit a preceding color filter array, since the inclusion of any filter necessarily would decrease the signal-to-noise ratio by filtering the amount of light incident on the image sensor. In contrast, in this second example, the spectral responsivity of the image sensor is not necessarily tunable, but the spectral responsivity of a preceding color filter array is. For instance, there is a tunable color filter array described in U.S. Pat. No. 6,466,961 by Miller, "Methods for Adaptive Spectral, Spatial and Temporal Sensing for Imaging Applications", the content of which is incorporated herein by reference. This document describes an imaging assembly comprising a color filter array which precedes an image sensor whose spectral responsivity is constant, but in which the color filter array itself has a tunable spectral responsivity that can be adjusted by application of bias voltages to control electrodes. Each array element thus filters light incident on corresponding pixels of the image sensor, and the image sensor thereafter outputs signals from which a red-like channel, a green-like channel, and a blue-like channel, can all be derived for each pixel. In the case of a color filter array with temporal sensing, the channels for each pixel may be output sequentially, one after the other. In the case of a color filter array with spatial sensing, the channels for each pixel may be output simultaneously or nearly so, although demosaicing might be required depending on the geometry of the color filter array.

In some of these color filter arrays, the spectral responsivity is tunable on a pixel by pixel basis or a region-by-region basis. Bias voltages are applied in a grid-like spatial mask, such that the spectral responsivity for each pixel is tunable individually of other pixels, or such that the spectral responsivity for each region comprising multiple pixels is tunable individually of other regions.

According to an aspect of the disclosure herein, an image capture device is provided with an imaging assembly configured to capture an image and acquire image data. The imaging assembly has tunable sensitivities controlled by a capture setting, such as voltages applied to each pixel of an image sensor which has tunable spectral responsivity, or such as voltages that are applied to each array element of a color filter array which has tunable spectral responsivity. The color sensitivities for each pixel are thereby adjusted in accordance with a spatial mask.

Thus, in an example embodiment described herein, an image capture device includes an imaging assembly having a tunable spectral response. A default capture setting is applied to the tunable imaging assembly for setting the spectral response of the tunable imaging assembly to a predesignated default setting. Preview image data of a scene from imaging assembly is captured using the default capture setting. A user interface which includes a preview image based on the captured preview image data of the scene is displayed. A user designation of a ROI in the preview image is accepted, wherein the designation of the ROI is accepted via user manipulation of the user interface. A user selection of a targeted imaging property for the ROI is accepted, wherein the user selection is accepted via user manipulation of the user interface. A revised capture setting for the spectral responsivity of the tunable imaging assembly is computed, by revising the default capture setting based on the targeted imaging property for the ROI as selected by the user. The revised capture setting is applied to the tunable imaging assembly for setting the spectral response of the tunable imaging assembly to a revised setting. Image data from the imaging assembly is captured using the revised capture setting.

By virtue of this arrangement, it is ordinarily possible to capture an image of a scene based on imaging properties selected by a user. For example, it is typically possible for a user to select imaging properties such that the image is captured with good exposure and good color balance. In addition, it is ordinarily possible to do so with a single image capture operation, even for difficult scenes such as scenes with multiple regions each having different dynamic ranges or unusual color balance.

In one example embodiment, accepting the user selection of the targeted imaging property for the ROI comprises accepting a user selection of a target range for brightness for the ROI. In this case, the step of computing the revised capture setting for the spectral responsivity of the tunable imaging assembly comprises revising the default capture setting based on the target range for brightness for the ROI as selected by the user. According to this example embodiment, computing the revised capture setting comprises computing a brightness change parameter based on a comparison of original brightness values in the preview image data with the target range of brightness for the ROI as selected by the user, and combining the brightness change parameter with the default capture setting so as to compute the revised capture setting. In particular, in an example embodiment, computing the brightness change parameter comprises calculating a difference between the original brightness values in the preview image data and the target range of brightness for the ROI as selected by the user. In some embodiments, accepting the selection of the target range for brightness comprises displaying on the user interface a brightness range of the preview image data, and accepting a user manipulation of the brightness range so as to effect the selection of the target range for brightness for the ROI. For example, in one example embodiment, the brightness range of the preview image data is displayed on the user interface as a brightness histogram.

In another example embodiment, accepting the user selection of the targeted imaging property for the ROI comprises accepting a user selection of a target range for color balance for the ROI. In this case, the step of computing the revised capture setting for the spectral responsivity of the tunable imaging assembly comprises revising the default capture setting based on the target range for color balance for the ROI as selected by the user. According to this example embodiment, computing the revised capture setting comprises computing color change parameters based on a comparison of original color channel values in the preview image data with the target color balance for the ROI as selected by the user, and combining the color change parameters with the default capture setting so as to compute the revised capture setting. In particular, computing the color change parameters comprises calculating a difference between the original color channel values in the preview image data and the target color balance for the ROI as selected by the user. In some embodiments, accepting the selection of the target range for color balance comprises displaying on the user interface color channel ranges of the preview image data, and accepting a user manipulation of the color channel ranges so as to effect the selection of the target range for color balance for the ROI. For example, in one embodiment, the color channel ranges of the preview image data are displayed on the user interface as color channel histograms.

In some example embodiments, the default capture setting and the revised capture setting both comprise an electronic spatial mask, and wherein the revised capture setting comprises an electronic spatial mask with differing spectral responsivity settings in different regions of the mask.

In some embodiments described herein, the imaging assembly comprises an image sensor which has a tunable spectral response. In other embodiments described herein, the imaging assembly comprises an image sensor and a preceding color filter array which has a tunable spectral response.

In one example embodiment, after capturing image data with the revised capture setting, a user interface which includes a preview image based on the image data captured with the revised capture setting is displayed, and it is determined whether a user has or has not designated the ROI on the displayed preview image. Responsive to a determination that the user has not designated the ROI, image data is captured using the revised capture setting, and the image data is stored. On the other hand, responsive to a determination that the user has designated the ROI, a second user selection of a targeted imaging property for the ROI is accepted, a second revised capture setting for the spectral responsivity of the tunable imaging assembly is computed based on the targeted imaging property for the ROI as selected by the user, and the second revised capture setting is applied to the tunable imaging assembly setting for setting the spectral response of the tunable imaging assembly to the second revised capture setting.

This brief summary has been provided so that the nature of this disclosure may be understood quickly. A more complete understanding can be obtained by reference to the following detailed description and to the attached drawings.

BRIEF DESCRIPTION OF THE DRAWINGS

FIGS. 1A and 1B are representative views for explaining the exterior appearance of an image capture device relevant to one example embodiment.

FIGS. 2A and 2B are detailed block diagrams for explaining the internal architecture of the image capture device shown in FIG. 1 according to one example embodiment.

FIG. 3 is a view for explaining software architecture of the image capture device shown in FIG. 1 according to one example embodiment.

DETAILED DESCRIPTION

<FIGS. 1 to 5>

Figure 2B:
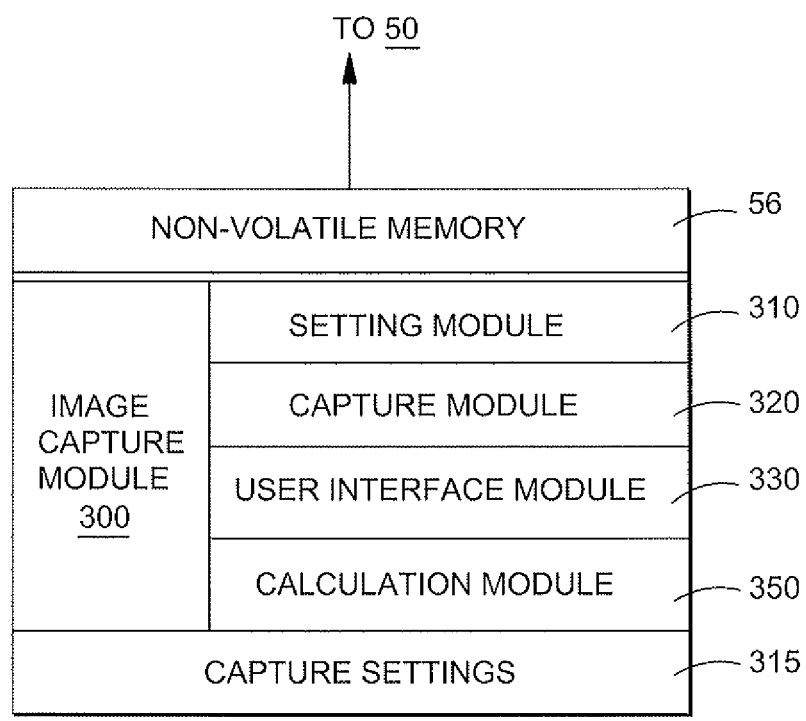

FIGS. 1A and 1B are representative views for explaining the exterior appearance of an image capture device relevant to one example embodiment. Note in these figures, some components are omitted for description purpose. As shown in FIGS. 1A and 1B, image capture device 100 is constructed as an embedded and hand held device including a optical system 10 and a connector 112 for connection to external devices. In the embodiment of FIGS. 1A and 1B, interface connector 112 is a USB interface connector, but other wired and wireless interfaces may be used.

Image capture device 100 further includes a variety of user interfaces for permitting a user to interact therewith, such as shutter release 310, an image display unit 28 for displaying menus and thumbnail images, and a series of selector buttons for permitting display and selection of menu items.

While FIGS. 1A and 1B depict one example embodiment of image capture device 100, it should be understood that the image capture device 100 may be configured in the form of, for example, a digital camera, a video camera, or any type of device including a camera, such as a pager, a cellular telephone, a radio telephone, a personal computer, a personal digital assistant (PDA), a Moving Pictures Expert Group Layer 3 (MP3) player, and/or the like.

FIG. 2A is a detailed block diagram for explaining the internal architecture of the image capture device 100 shown in FIG. 1 according to one example embodiment. Referring to FIG. 2A, reference numeral 10 denotes an imaging lens; 12, a shutter having an aperture function; and 14, an image sensor which has a spectral response which is tunable in accordance with a capture setting, which converts an optical image into an electrical signal. Reference numeral 16 denotes an A/D converter which converts an analog signal into a digital signal. The A/D converter 16 is used when an analog signal output from the image sensor 14 is converted into a digital signal and when an analog signal output from an audio controller 11 is converted into a digital signal. Reference numeral 102 denotes a shield, or barrier, which covers the image sensor including the lens 10 of the digital camera 100 to prevent an image capturing system including the lens 10, shutter 12, and image sensor 14 from being contaminated or damaged.

In FIG. 2A, an imaging assembly is comprised of image sensor 14 and associated optics, such that in some embodiments the imaging assembly is comprised of image sensor 14 and lens 10.

The optical system 10 may be of a zoom lens, thereby providing an optical zoom function. The optical zoom function is realized by driving a magnification-variable lens of the optical system 10 using a driving mechanism of the optical system 10 or a driving mechanism provided on the main unit of the digital camera 100.

A light beam (light beam incident upon the angle of view of the lens) from an object in a scene that goes through the optical system (image sensing lens) 10 passes through an opening of a shutter 12 having a diaphragm function, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data). The image sensor 14 and the A/D converter 16 are controlled by clock signals and control signals provided by a timing generator 18. The timing generator 18 is controlled by a memory controller 22 and a system controller 50.

Image sensor 14 is an image sensor which has a spectral response which is tunable in accordance with a capture setting 17. For each pixel, image sensor 14 outputs three or more channels of color information, including a red-like channel, a green-like channel and a blue-like channel. The precise nature of the spectral responsivity of image sensor 14 is controlled via capture setting 17. In this embodiment, capture setting 17 may be comprised of multiple spatial masks, with one mask each for each channel of information output by image sensor 14. Thus, in this example, where image sensor 14 outputs three or more channels, capture setting 17 includes a spatial mask DR for the red-like channel of information, a spatial mask DG for the green-like channel of information, and a spatial mask DB for the blue-like channel of information. Each spatial mask comprises an array of control parameters corresponding to pixels or regions of pixels in image sensor 14. The spectral responsivity of each pixel, or each region of plural pixels, is thus tunable individually and independently of other pixels or regions of pixels.

Reference numeral 18 denotes a timing generator, which supplies clock signals and control signals to the image sensor 14, the audio controller 11, the A/D converter 16, and a D/A converter 26. The timing generator 18 is controlled by a memory controller 22 and system controller 50. Reference numeral 20 denotes an image processor, which applies resize processing such as predetermined interpolation and reduction, and color conversion processing to data from the A/D converter 16 or that from the memory controller 22. The image processor 20 executes predetermined arithmetic processing using the captured image data, and the system controller 50 executes exposure control and ranging control based on the obtained arithmetic result.

As a result, TTL (through-the-lens) AF (auto focus) processing, AE (auto exposure) processing, and EF (flash pre-emission) processing are executed. The image processor 20 further executes predetermined arithmetic processing using the captured image data, and also executes TTL AWB (auto white balance) processing based on the obtained arithmetic result. It is understood that in other embodiments, optical finder 104 may be used in combination with the TTL arrangement, or in substitution therefor.

Output data from the A/D converter 16 is written in a memory 30 via the image processor 20 and memory controller 22 or directly via the memory controller 22. The memory 30 stores image data which is captured by the image sensor 14 and is converted into digital data by the A/D converter 16, and image data to be displayed on an image display unit 28. The image display unit 28 may be a liquid crystal screen. Note that the memory 30 is also used to store audio data recorded via a microphone 13, still images, movies, and file headers upon forming image files. Therefore, the memory 30 has a storage capacity large enough to store a predetermined number of still image data, and movie data and audio data for a predetermined period of time.

A compression/decompression unit 32 compresses or decompresses image data by adaptive discrete cosine transform (ADCT) or the like. The compression/decompression unit 32 loads captured image data stored in the memory 30 in response to pressing of the shutter 310 as a trigger, executes the compression processing, and writes the processed data in the memory 30. Also, the compression/decompression unit 32 applies decompression processing to compressed image data loaded from a detachable recording unit 202 or 212, as described below, and writes the processed data in the memory 30. Likewise, image data written in the memory 30 by the compression/decompression unit 32 is converted into a file by the system controller 50, and that file is recorded in the recording unit 202 or 212, as also described below.

The memory 30 also serves as an image display memory (video memory). Reference numeral 26 denotes a D/A converter, which converts image display data stored in the memory 30 into an analog signal, and supplies that analog signal to the image display unit 28. Reference numeral 28 denotes an image display unit, which makes display according to the analog signal from the D/A converter 26 on the liquid crystal screen 28 of an LCD display. In this manner, image data to be displayed written in the memory 30 is displayed by the image display unit 28 via the D/A converter 26.

The exposure controller 40 controls the shutter 12 having a diaphragm function based on the data supplied from the system controller 50. The exposure controller 40 may also have a flash exposure compensation function by linking up with a flash (flash emission device) 48. The flash 48 has an AF auxiliary light projection function and a flash exposure compensation function.

The distance measurement controller 42 controls a focusing lens of the optical system 10 based on the data supplied from the system controller 50. A zoom controller 44 controls zooming of the optical system 10. A shield controller 46 controls the operation of a shield (barrier) 102 to protect the optical system 10.

Reference numeral 13 denotes a microphone. An audio signal output from the microphone 13 is supplied to the A/D converter 16 via the audio controller 11 which includes an amplifier and the like, is converted into a digital signal by the A/D converter 16, and is then stored in the memory 30 by the memory controller 22. On the other hand, audio data is loaded from the memory 30, and is converted into an analog signal by the D/A converter 26. The audio controller 11 drives a speaker 15 according to this analog signal, thus outputting a sound.

A nonvolatile memory 56 is an electrically erasable and recordable memory, and uses, for example, an EEPROM. The nonvolatile memory 56 stores constants, computer-executable programs, and the like for operation of system controller 50. Note that the programs include those for execution of various flowcharts.

In particular, and as shown in FIG. 2B, non-volatile memory 56 is an example of a non-transitory computer-readable memory medium, having stored thereon image capture module 300 as described herein. According to this example embodiment, the image capture module 300 includes at least a setting module 310, a capture module 320, a user interface module 330, and a calculation module 350. Briefly, the setting module 310 comprises computer-executable process steps executed by a computer for applying a capture setting to the image sensor 14 for setting the spectral response of the tunable imaging assembly to a setting. The capture module 320 comprises computer-executable process steps executed by a computer for capturing image data of a scene from the image sensor 14 using the capture setting. The user interface module 330 comprises computer-executable process steps executed by a computer for displaying a user interface which includes a preview image based on the captured image data, for accepting a user designation of a region of interest (ROI) in the preview image, and for accepting a user selection of a targeted imaging property for the ROI. The calculation module 350 comprises computer-executable process steps executed by a computer for computing a revised capture setting for the spectral responsivity of the tunable imaging assembly. These modules will be discussed in more detail below with respect to FIG. 3.

Also stored on non-volatile memory 56 are pre-designated capture settings 315 for application to image sensor 14 so as to control spectral responsivity of the imaging assembly. In this embodiment, the capture settings 315 are comprised of spatial masks so as to permit pixel-by-pixel or region-by-region control of spectral responsivity, independently of other pixels or regions.

Reference numeral 50 denotes a system controller, which controls the entire digital camera 100. The system controller 50 executes programs recorded in the aforementioned non-volatile memory 56 to implement respective processes to be described later of this embodiment. Reference numeral 52 denotes a system memory which comprises a RAM. On the system memory 52, constants and variables required to operate system controller 50, programs read out from the nonvolatile memory 56, and the like are mapped.

A mode selection switch 60, shutter switch 310, and operation unit 70 form operation means used to input various operation instructions to the system controller 50.

The mode selection switch 60 includes the imaging/playback selection switch, and is used to switch the operation mode of the system controller 50 to one of a still image recording mode, movie recording mode, playback mode, and the like.

The shutter switch 62 is turned on in the middle of operation (half stroke) of the shutter button 310 arranged on the digital camera 100, and generates a first shutter switch signal SW1. Also, the shutter switch 64 is turned on upon completion of operation (full stroke) of the shutter button 310, and generates a second shutter switch signal SW2. The system controller 50 starts the operations of the AF (auto focus) processing, AE (auto exposure) processing, AWB (auto white balance) processing, EF (flash pre-emission) processing, and the like in response to the first shutter switch signal SW1. Also, in response to the second shutter switch signal SW2, the system controller 50 starts a series of processing (shooting) including the following: processing to read image signals from the image sensor 14, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in the recording medium 200 or 210.

A zoom operation unit 65 is an operation unit operated by a user for changing the angle of view (zooming magnification or shooting magnification). The operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on. More specifically, the operation unit 70 includes a menu button, a set button, a macro selection button, a multi-image reproduction/repaging button, a single-shot/serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

The compression mode switch is provided for setting or selecting a compression rate in JPEG (Joint Photographic Expert Group) compression, recording in a RAW mode and the like. In the RAW mode, analog image signals outputted by the image sensing device are digitalized (RAW data) as it is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the JPEG compression mode includes, e.g., a normal mode and a fine mode. A user of the digital camera 100 can select the normal mode in a case of placing a high value on the data size of a shot image, and can select the fine mode in a case of placing a high value on the quality of a shot image.

In the JPEG compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of the color filter of the image sensing device 14, and image data written in the memory 30 through the A/D converter 16 and the memory controller 22 is recorded in the recording medium 200 or 210.

Note that the digital camera 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a JPEG form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as an NiCd battery, an NiMH battery or an Li battery, an AC adapter, or the like. The main unit of the digital camera 100 and the power source 86 are connected by connectors 82 and 84 respectively comprised therein.

The recording media 200 and 210 comprise: recording units 202 and 212 that are configured with semiconductor memories, magnetic disks and the like, interfaces 203 and 213 for communication with the digital camera 100, and connectors 206 and 216. The recording media 200 and 210 are connected to the digital camera 100 through connectors 206 and 216 of the media and connectors 92 and 96 of the digital camera 100. To the connectors 92 and 96, interfaces 90 and 94 are connected. The attached/detached state of the recording media 200 and 210 is detected by a recording medium attached/detached state detector 98.

Note that although the digital camera 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the digital camera and other peripheral devices such as computers and printers. The communication cards include, for instance, a LAN card, a modem card, a USB card, an IEEE 1394 card, a P1284 card, an SCSI card, and a communication card for PHS or the like.

The optical finder 104 is configured with, e.g., a TTL finder, which forms an image from the light beam that has gone through the lens 10 utilizing prisms and minors. By utilizing the optical finder 104, it is possible to shoot an image without utilizing an electronic view finder function of the image display unit 28. The optical finder 104 includes indicators, which constitute part of the display device 54, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the digital camera 100 to other devices, or an antenna can be provided for wireless communication.

A real-time clock (RTC, not shown) may be provided to measure date and time. The RTC holds an internal power supply unit independently of the power supply controller 80, and continues time measurement even when the power supply unit 86 is OFF. The system controller 50 sets a system timer using a date and time obtained from the RTC at the time of activation, and executes timer control.

FIG. 3 is a view for explaining software architecture of the image capture device 100 of FIG. 1 according to one example embodiment. As previously discussed with respect to FIG. 2B, image capture module 300 comprises computer-executable process steps stored on a non-transitory computer-readable storage medium, such as non-volatile memory 56. In this example embodiment, as shown in FIG. 3, image capture module 300 includes computer-executable process steps for at least the setting module 310, the capture module 320, the user interface module 330, and the calculation module 350.

The setting module 310 is constructed to apply a capture setting 315 to the tunable image sensor 14 for setting the spectral response of the tunable imaging assembly to a setting. More specifically, for example, setting module 310 applies a default capture setting to the tunable image sensor 14 for setting the spectral response of the tunable imaging assembly to a predesignated default setting, and applies a revised capture setting to the tunable image sensor 14 for setting the spectral response of the imaging assembly to a revised setting. In this example embodiment, the default capture setting and the revised capture setting both comprise an electronic spatial mask. In particular, the revised capture setting comprises an electronic spatial mask with differing spectral responsivity settings in different regions of the mask.

The capture module 320 is constructed to capture image data of a scene from the image sensor 14 using the capture setting 315 applied by the setting module 310. Image data which is captured by the image sensor 14 is stored in memory 30. More specifically, for example, preview image data of a scene from the image sensor 14 is captured using the default capture setting, and revised image data from the image sensor 14 is captured using the revised capture setting. In this example embodiment, the default capture setting is provided by the manufacturer of the image sensor 14. In other example embodiments, the default capture setting is provided in any suitable manner, including, for example, by user specification.

The user interface module 330 is constructed to display a user interface which includes a preview image based on the captured preview image data of the scene. User interface module 330 is also constructed to accept a user designation of a region of interest (ROI) in the preview image, via user manipulation of the user interface.

Additionally, user interface module 330 is constructed to accept a user selection of a targeted imaging property for the ROI, also via user manipulation of the user interface. In one example embodiment, user interface module 330 comprises a brightness adjustment module which accepts a user selection of a target range for brightness for the ROI by displaying on the user interface a brightness range of the preview image data and accepting a user manipulation of the brightness range. According to this example embodiment, the brightness range of the preview image data is displayed on the user interface as a brightness histogram.

In another example embodiment, user interface module 330 comprises a color balance adjustment module which accepts a user selection of a target range for color balance for the ROI by displaying on the user interface color channel ranges of the preview image data and accepting a user manipulation of the color channel ranges. According to this example embodiment, the color channel ranges of the preview image data are displayed on the user interface as color channel histograms.

The calculation module 350 is constructed to compute the revised capture setting for the spectral responsivity of the tunable image sensor 14, by revising the default capture setting based on the targeted imaging property for the ROI as selected by the user. In this embodiment, the revised capture setting comprises an electronic spatial mask.

Generally, calculation module 350 receives the targeted imaging property for the ROI from user interface module 330 and obtains original parameters 340 for the designated ROI in order to revise the capture setting. Original parameters 340 are statistical values of the imaging properties that characterize the ROI before adjustment by the user. For example, the original imaging property values may be a median of the brightness values or a median of the RGB values for the designated ROI. In this example embodiment, the original imaging property values are previously stored by the image capture device 100 when capture module 320 captures image data of a scene from the image sensor 14, for example, in memory 26. In this case, calculation module 350 accesses memory 56 in order to obtain the original parameters 340 for the ROI.

In the case that the targeted imaging property is a brightness value, the calculation module is constructed to revise the default capture setting based on the target range for brightness for the ROI as selected by the user. In this case, the calculation module computes a brightness change parameter based on a comparison of the obtained original brightness values with the target range of brightness as selected by the user, and combines the brightness change parameter with the default capture setting so as to compute the revised capture setting. More specifically, the brightness change parameter is computed, for example, by calculating a difference between the original brightness values in the preview image data and the target range of brightness for the ROI as selected by the user. In an example embodiment, the brightness change parameter is associated with a bias voltage for the electronic spatial mask. For example, the brightness change parameter is associated with the bias voltage by using a lookup table. Of course, any other suitable method of association may be used, including for example, by providing a module which generates the appropriate bias voltages based on the brightness change parameter.

In the case that the targeted imaging property is a color balance value, the calculation module is constructed to revise the default capture setting based on the target range for color balance for the ROI as selected by the user. In this case, the calculation module computes color change parameters based on a comparison of the obtained original color channel values with the target color balance as selected by the user, and combines the color change parameters with the default capture setting so as to compute the revised capture setting. More specifically, the color change parameters are computed, for example, by calculating a difference between the original color channel values in the preview image data and the target color balance for the ROI as selected by the user. In an example embodiment, the color change parameters are associated with bias voltages for the electronic spatial mask. For example, the color change parameters are associated with bias voltages by using a lookup table. Of course, any other suitable method of association may be used, including for example, by providing a module which generates the appropriate bias voltages based on the color change parameters.

In some example embodiments, image capture module 300 further includes a determination module (not shown) constructed to determine whether a user has or has not designated the ROI on the displayed preview image. According to these embodiments, responsive to a determination that the user has not designated the ROI, the capture module is constructed to capture image data using the revised capture setting, and to store the captured image data. On the other hand, responsive to a determination that the user has designated the ROI, the user interface module is constructed to accept a second user selection of a targeted imaging property for the ROI. In this situation, the calculation module is constructed to compute a second revised capture setting for the spectral responsivity of the tunable imaging assembly based on the targeted imaging property for the ROI as selected by the user, and the setting module is constructed to apply the second revised capture setting to the tunable image sensor setting for setting the spectral response of the tunable imaging assembly to the second revised capture setting.

Figure 4A:
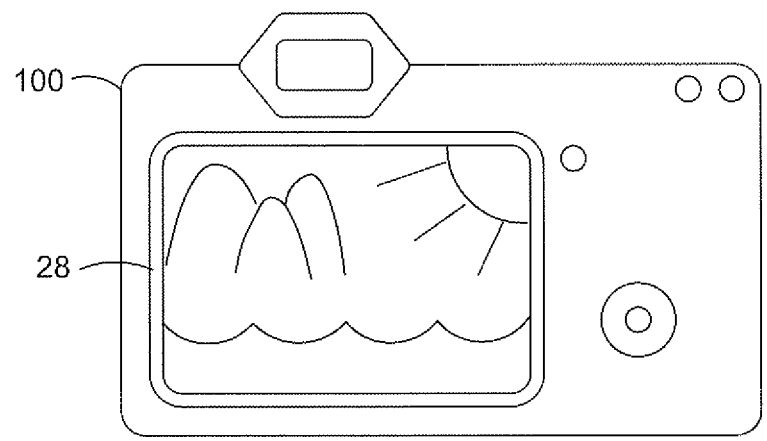
FIG. 4A is a view for explaining display of an image by the image capture device shown in FIG. 1 according to one example embodiment.

FIG. 4A is a view for explaining display of an image by the image capture device shown in FIG. 1 according to one example embodiment. In particular, a rear view of image capture device 100 having image display unit 28 is provided in FIG. 4A. According to this example embodiment, a user interface which includes a preview image based on captured image data of a scene is displayed on the image display unit 28.

In some cases, image data captured by the image capture device 100 and displayed on the image display unit 28 includes regions where the preferable brightness value varies widely. In such cases, adjusting the brightness value globally may result in certain areas of the image where the luminance looks incorrect or not pleasing from an aesthetic point of view. In other situations, image data captured by the image capture device 100 and displayed on the image display unit 28 includes regions where the preferable color balance varies widely. In such situations, adjusting the color balance globally may result in certain areas of the image where the color balance looks incorrect or not pleasing from an aesthetic point of view. In still other cases, image data captured by the image capture device 100 and displayed on the image display unit 28 includes regions where imaging properties other than brightness and color balance vary widely. In such cases, adjusting such imaging properties globally may result in certain areas of the image where the imaging property looks incorrect or not pleasing from an aesthetic point of view.

In some example embodiments, the user interface includes ranges for imaging properties of the preview image, in addition to the preview image. In this case, the imaging property ranges for the preview image, such as histograms or slide bars, are displayed together with the preview image.

Figure 4B:
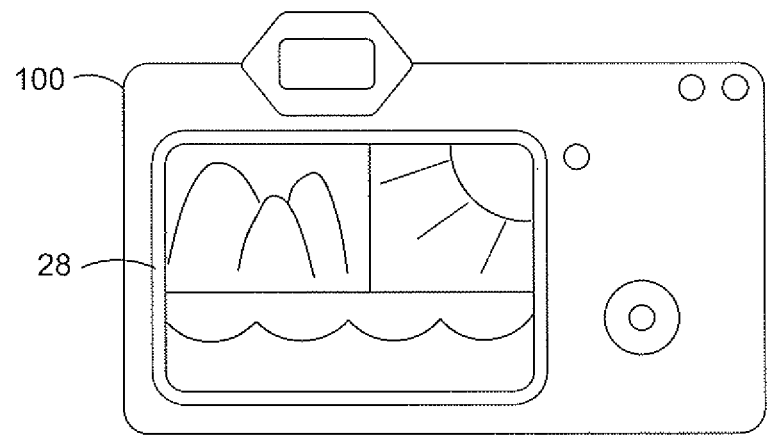
FIG. 4B is a view for explaining acceptance, by the image capture device shown in FIG. 1, of a designation of a region of interest according to one example embodiment.

FIG. 4B is a view for explaining acceptance of a designation of a region of interest according to one example embodiment. As shown in FIG. 4B, the preview image displayed on the image display unit 28 depicts an image divided into a plurality of regions. In particular, the preview image includes three regions. In one region of the preview image, a landscape of mountains in the background is displayed. In another region, the sun is displayed. In a third region, a body of water is displayed.

The user controlling the image capture device 100 views the image displayed on the image display unit 28 as shown in FIG. 4A, and decides whether an imaging property for at least one of the regions in the image should be adjusted. In this example embodiment, if the user decides to adjust the imaging property for a designated ROI, the image is divided for the user to select and adjust the imaging property for the designated ROI. For example, if the user decides that the brightness values for the three different areas of the image should be adjusted, the image is divided into three regions of interest for the user to select and adjust the exposure values. If the user decides that the color balance values for the three different areas of the image should be adjusted, the image is divided into three regions of interest for the user to select and adjust the color balance values. Division of the image is described in more detail below, with respect to FIG. 5.

Figure 4C:
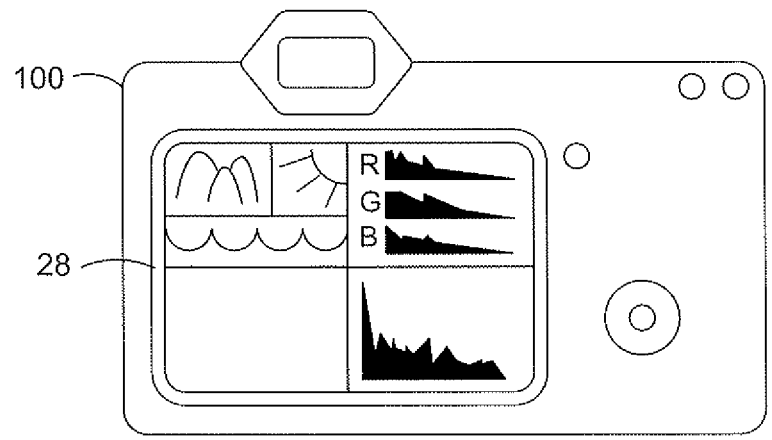
FIGS. 4C to 4E are views for explaining acceptance, by the image capture device shown in FIG. 1, of a selection of a targeted imaging property according to one example embodiment.
Figure 4D:
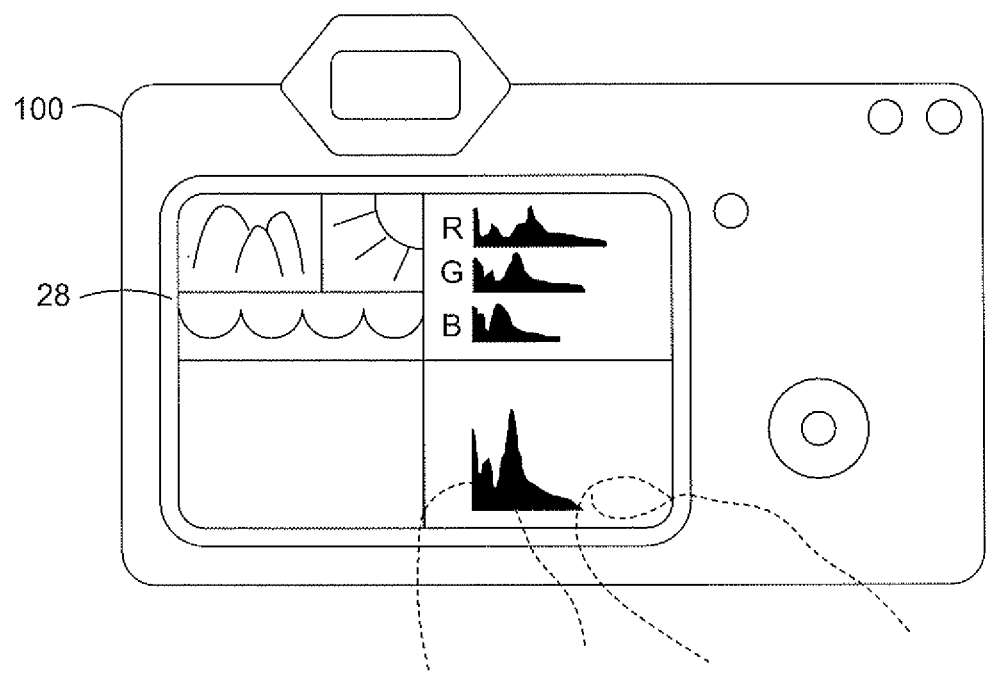
Figure 4E:
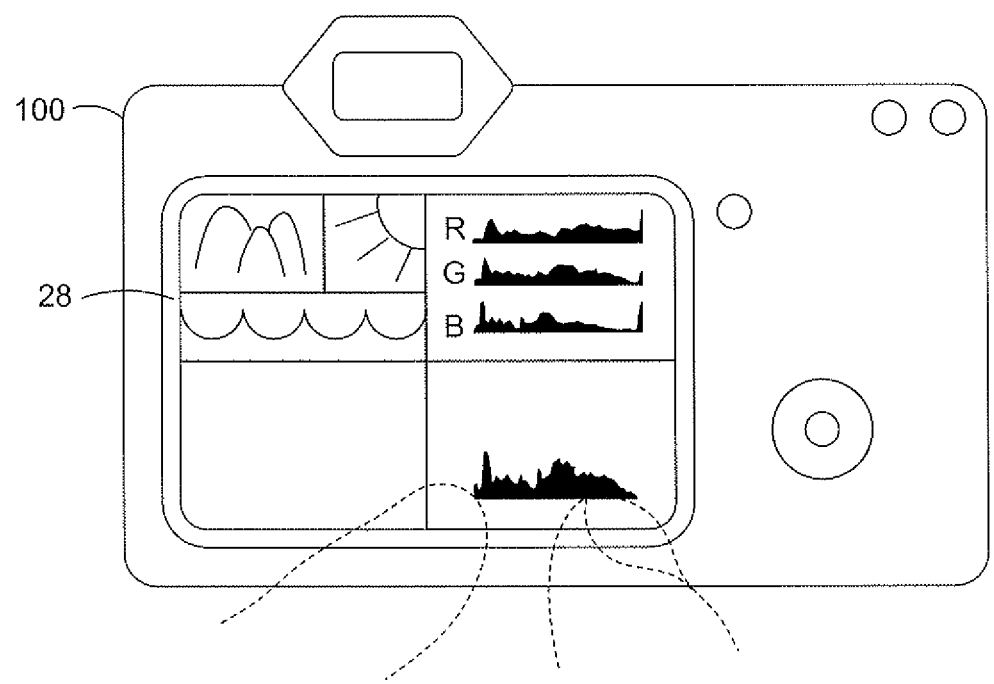

FIGS. 4C to 4E are views for explaining acceptance of a selection of a targeted imaging property according to one example embodiment. In particular, FIGS. 4C to 4E are examples of user interfaces including imaging property ranges, which effect the selection of target ranges for such imaging properties.

As shown in FIG. 4C, image display unit 28 displays on the user interface an imaging property range of the image data previewed on image display unit 28. By manipulating the imaging property range as shown in FIGS. 4D and 4E, the user effects the selection of the targeted imaging property for the designated region of interest. In some example embodiments, the user interface displays an imaging property range including values of the imaging property which fall within a tunable range of the imaging assembly. As discussed below in more detail with respect to FIG. 5, after the user designates one region of interest and selects a target range for the imaging property for the designated region, the user may then designate a different region on the image display unit 28.

For example, in the case that the targeted imaging property is a target range for brightness, the image display unit 28 displays on the user interface a brightness range of the image data previewed on image display unit 28. In some example embodiments, the brightness range is displayed as a brightness histogram. In other example embodiments, the brightness range is displayed as a slide bar, a dial, a button, or any other type of suitable representation. By manipulating the brightness range, the user effects the selection of the target range for brightness for the region of interest. With this arrangement, the user selects the target range for brightness for the designated region of interest, typically with ease and simplicity.

In the case that the targeted imaging property is a target range for color balance, the image display unit 28 displays on the user interface color channel ranges of the image data previewed on image display unit 28. In some example embodiments, the color channel ranges are displayed as color channel histograms. In other example embodiments, the color channel ranges are displayed as slide bars, dials, buttons, or any other type of suitable representation. By manipulating the color channel ranges, the user effects the selection of the target range for color balance for the region of interest. With this arrangement, the user selects the target range for color balance for the designated ROI, typically with ease and simplicity.

In this example embodiment, for a designated ROI, the user selects at least one targeted imaging property for adjustment. For example, the user can select one of the target range for brightness or the target range for color balance. In addition, the user can select both the target range for brightness and the target range for color balance. Thus, the user can select any combination of imaging properties for adjustment.

Moreover, in this embodiment, ranges for all of the targeted imaging properties to be adjusted are displayed on a single user interface. For example, the user interface displays slide bars representing color channel ranges together with a slide bar representing a brightness range. Alternatively, selection of targeted imaging properties can be performed in a multi-step process, in which the user interface displays one or any combination of targeted imaging properties to be adjusted.

In some example embodiments, after the user selects a region of interest and selects a target range for the imaging property for the designated region, the image capture device automatically determines an appropriate transition of the imaging property at a boundary between the selected region of interest and other regions in the preview image. For example, the image capture device may interpolate the values of the imaging property at the boundary between the designated region of interest and another region in the preview image, such that the transition between the regions is smooth.

The user interfaces depicted in FIGS. 4A to 4E are merely examples of user interfaces which can be displayed by user interface module 330 according to this example embodiment. It should be understood that other types of suitable interfaces can also be displayed.

Figure 5:
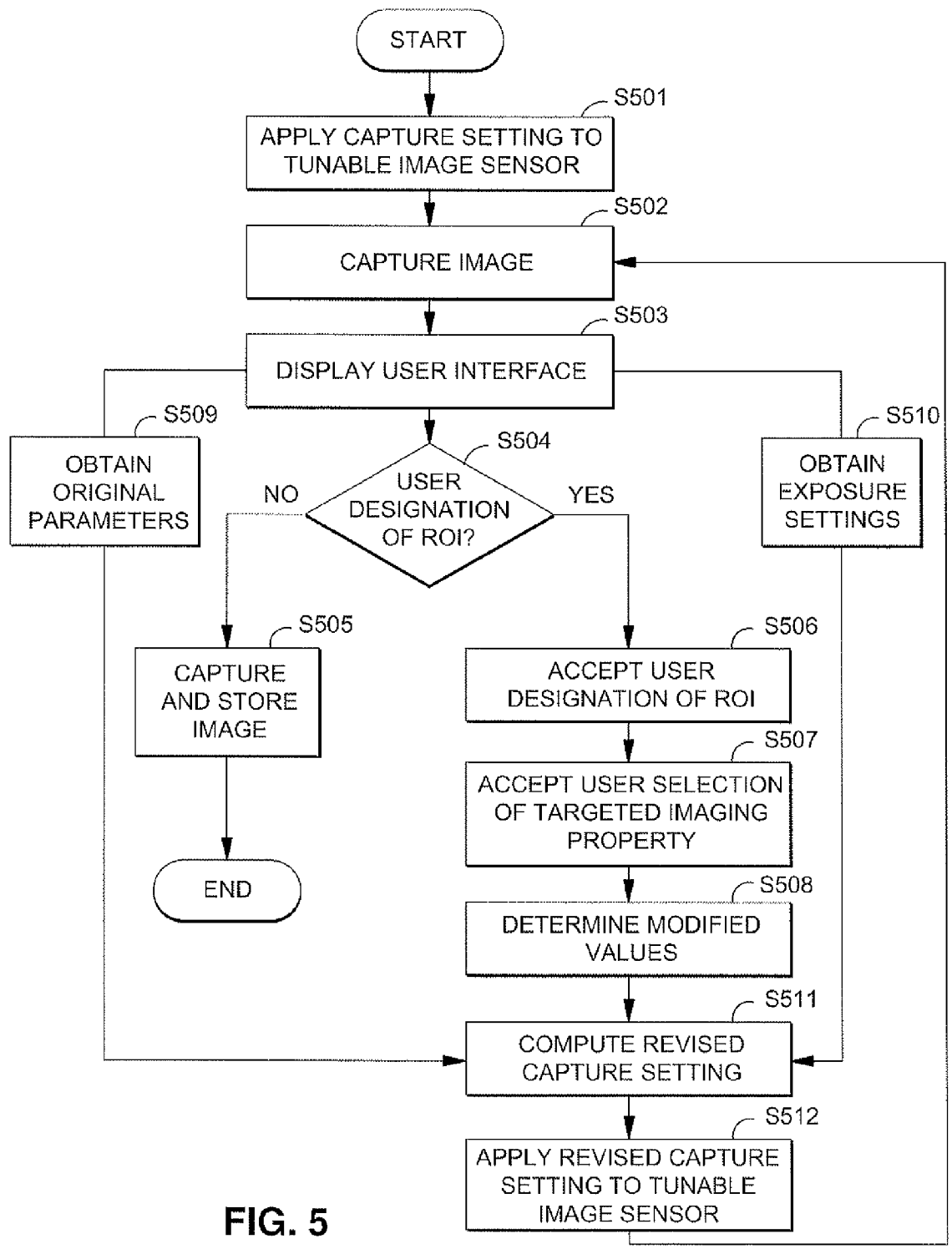
FIG. 5 is a flow diagram for explaining processing in the image capture device shown in FIG. 1 according to one example embodiment.

FIG. 5 is a flow diagram for explaining processing in the image capture device shown in FIG. 1 according to one example embodiment. Briefly, according to FIG. 5, a default capture setting is applied to an imaging assembly such as an imaging assembly which includes a tunable image sensor for setting the spectral response of the tunable imaging assembly to a predesignated default setting. Preview image data of a scene from the imaging assembly is captured using the default capture setting. A user interface which includes a preview image based on the captured preview image data of the scene is displayed. A user designation of a ROI in the preview image is accepted, wherein the designation of the ROI is accepted via user manipulation of the user interface. A user selection of a targeted imaging property for the ROI is accepted, wherein the user selection is accepted via user manipulation of the user interface. A revised capture setting for the spectral responsivity of the tunable imaging assembly is computed, by revising the default capture setting based on the targeted imaging property for the ROI as selected by the user. The revised capture setting is applied to the tunable imaging assembly for setting the spectral response of the tunable imaging assembly to a revised setting. Image data from the imaging assembly is captured using the revised capture setting.

In more detail, the process shown in FIG. 5 starts with application of a default capture setting, then capturing an image using the default capture setting. The image is captured and displayed on the image display unit 28 by a half stroke of shutter switch (SW1) 62 before the shutter switch (SW2) 64 is switched on by a full stroke of the shutter button by a user of the image capture device 100.

As shown in FIG. 5, in step S501, setting module 310 applies a default capture setting to the tunable image sensor 14 for setting the spectral response of the tunable imaging assembly to a predesignated default setting. In this embodiment, the default capture setting comprises an electronic spatial mask which individually tunes each pixel or each region of plural pixels in tunable image sensor 14.

In step S502, capture module 320 captures preview image data of a scene from the image sensor 14 using the default capture setting applied by the setting module 310, according to this example embodiment. In other example embodiments, image capture device 100 automatically determines a color balance for the preview image data, and automatically derives a capture setting for the preview image data to be applied to image sensor 14. In this case, capture module 320 captures preview image data of a scene using the capture setting automatically derived by image capture device 100.

In step S503, user interface module 330 displays a user interface which includes a preview image based on the captured preview image data of the scene, for example, as shown in FIG. 4A. In some embodiments, the user interface also includes ranges for imaging properties of the preview image, in addition to the preview image.

In step S504, the determination module determines whether a user has or has not designated the ROI on the displayed preview image. In this example embodiment, the ROI is designated by the user through an input via a button associated with the operation unit 70 which is then relayed to the system controller 50. In other embodiments, the user designates the ROI by contacting the region of the image displayed on the image display unit 28 where the image display unit 28 is a touch screen, or by voice command. If the user has not designated the ROI ("NO" at step S504), the capture module 320 captures image data using the predesignated default setting at step S505 and stores the captured image data in memory 30.

On the other hand, if it is determined that the user has designated the ROI ("YES" at step S504), the user interface module 330 accepts the user designation of the ROI in the preview image at step S506, for example, as shown in FIG. 4B. In this example embodiment, when the user designates the ROI in the preview image, user interface module 330 determines the pixels of the image which are included in the ROI. For example, user interface module 330 executes a spatial filtering algorithm to determine the edges of the ROI. Alternatively, the illumination of each pixel in the preview image is determined, and pixels having substantially the same illumination are determined to be included in the ROI. Of course, any other suitable algorithms for dividing the image into regions can also be used.

In other example embodiments, user interface module 330 divides the preview image into regions before the user interface module 330 accepts the user designation of the ROI. In this case, the user of the image capture device selects the quantity of regions to divide the displayed image. In some embodiments, the number of regions the image is divided into is based on the number of different illuminants associated with the scene that is captured. For example, if the displayed image includes two different illuminants, the user divides the image into two regions. In another case, the displayed image may include three different illuminants; the user may divide the image into three regions. From a practical standpoint, the user may typically divide the image between two to six regions, depending on the color balance goals of the user and the various illuminants associated with the displayed image. Additionally, the user may adjust the size of the regions relative to the image displayed.

Turning to step S507, user interface module 330 accepts a user selection of a targeted imaging property for the ROI, for example, as shown in FIGS. 4C to 4E. In the case that the targeted imaging property is a target range for brightness, the user interface module 330 displays a brightness range of the preview image data and accepts a user manipulation of the brightness range so as to effect the selection of the target range for brightness for the ROI. In the case that the targeted imaging property is a target range for color balance, the user interface module 330 displays color channel ranges of the preview image data and accepts a user manipulation of the color channel ranges so as to effect the selection of the target range for color balance for the ROI. With this arrangement, the user advantageously specifies the imaging property associated with a specific region of interest in the image displayed on the image display unit 28, rather than making a global adjustment to the entire image displayed on the image display unit 28. Furthermore, the user advantageously specifies the imaging property based on any suitable criteria, including, for example, a lookup table and/or aesthetic concerns.

In step S508, calculation module 350 determines the modified value of the targeted imaging property for the ROI, based on the user selection of the targeted imaging property in step S507. In step S509, calculation module 350 obtains original parameters 340 for the designated ROI from memory 56.

In step S510, calculation module 350 obtains the exposure settings of image capture device 100. In this regard, the exposure settings of image capture device 100 are the settings that are provided to exposure controller 40 to control the amount of light that will reach image sensor 14. The exposure settings of image capture device 100 are previously determined by the image capture device 100 according to a predesignated default determined by AE processing, or alternatively are selected by a user. The exposure settings are stored in a memory, such as memory 56, and accessed by calculation module 350 in order to calculate the appropriate setting for the selected targeted imaging properties. For example, in some cases, the imaging assembly adjusts the length of exposure based on the selection of the targeted imaging properties by the user.

In step S511, calculation module 350 computes a revised capture setting for the spectral responsivity of the tunable image sensor 14, by revising the default capture setting based on the targeted imaging property for the ROI as selected by the user. In this embodiment, the revised capture setting comprises an electronic spatial mask. Generally, the calculation module 350 computes the revised capture setting based on the obtained original parameters 340 for the designated ROI, the exposure settings of image capture device 100, and the modified values of the targeted imaging property for the ROI which are calculated from the user selection of the targeted imaging property in step S507.

More specifically, in the case that the targeted imaging property is a target range for brightness, computing the revised capture setting for the spectral responsivity of the tunable image sensor 14 comprises revising the default capture setting based on the target range for brightness for the ROI as selected by the user. In this case, the default capture setting is revised by computing a brightness change parameter based on a comparison of original brightness values in the preview image data with the target range of brightness for the ROI as selected by the user, and combining the brightness change parameter with the default capture setting so as to compute the revised capture setting. In particular, computing the brightness change parameter comprises calculating a difference between the original brightness values in the preview image data and the target range of brightness for the ROI as selected by the user. In this case, the revised capture setting comprising the electronic spatial mask is generated by associating the brightness change parameters with bias voltages for the electronic spatial mask.

In the case that the targeted imaging property is a target range for color balance, computing the revised capture setting for the spectral responsivity of the tunable image sensor 14 comprises revising the default capture setting based on the target range for color balance for the ROI as selected by the user. In this case, the default capture setting is revised by computing color change parameters based on a comparison of original color channel values in the preview image data with the target color balance for the ROI as selected by the user, and combining the color change parameters with the default capture setting so as to compute the revised capture setting. In particular, computing the color change parameters comprises calculating a difference between the original color channel values in the preview image data and the target color balance for the ROI as selected by the user. In this case, the revised capture setting comprising the electronic spatial mask is generated by associating the color change parameters with bias voltages for the electronic spatial mask.

In step S512, the setting module 310 applies the revised capture setting to the tunable image sensor 14 for setting the spectral response of the tunable image sensor 14 to the revised setting. Subsequently, the flow returns to step S502 where the capture module 320 captures image data from the imaging assembly using the revised capture setting.

After capturing image data with the revised capture setting in step S502, user interface module 330 displays the user interface in step S503. At this time, the user interface includes a preview image based on the image data captured with the revised capture setting. In step S504, the determination module determines whether the user has or has not designated another ROI on the displayed preview image. Responsive to a determination that the user has designated another ROI ("YES" at S504), user interface module 330 accepts a second user selection of a targeted imaging property for the ROI, calculation module 350 calculates a second revised capture setting for the spectral responsivity of the tunable image sensor 14 based on the targeted imaging property for the ROI as selected by the user, and setting module 310 applies the second revised capture setting to the tunable image sensor 14 for setting the spectral response of the tunable imaging assembly to the second revised capture setting.

On the other hand, responsive to a determination that the user has not designated another ROI ("NO" at step S504), capture module 320 captures image data using the revised capture setting, and stores the image data. At this time, setting module 310 applies the default capture setting to the image sensor 14, in order to return the setting of the imaging assembly to the predesignated default setting.

By virtue of this arrangement, the user typically adjusts imaging properties for a region of interest rather than globally. Furthermore, the user previews the image and adjusts the imaging properties of individual regions to achieve substantially correct or aesthetically desired color balancing, before the image data for the captured image is written onto the recording medium 200.

Figure 6:
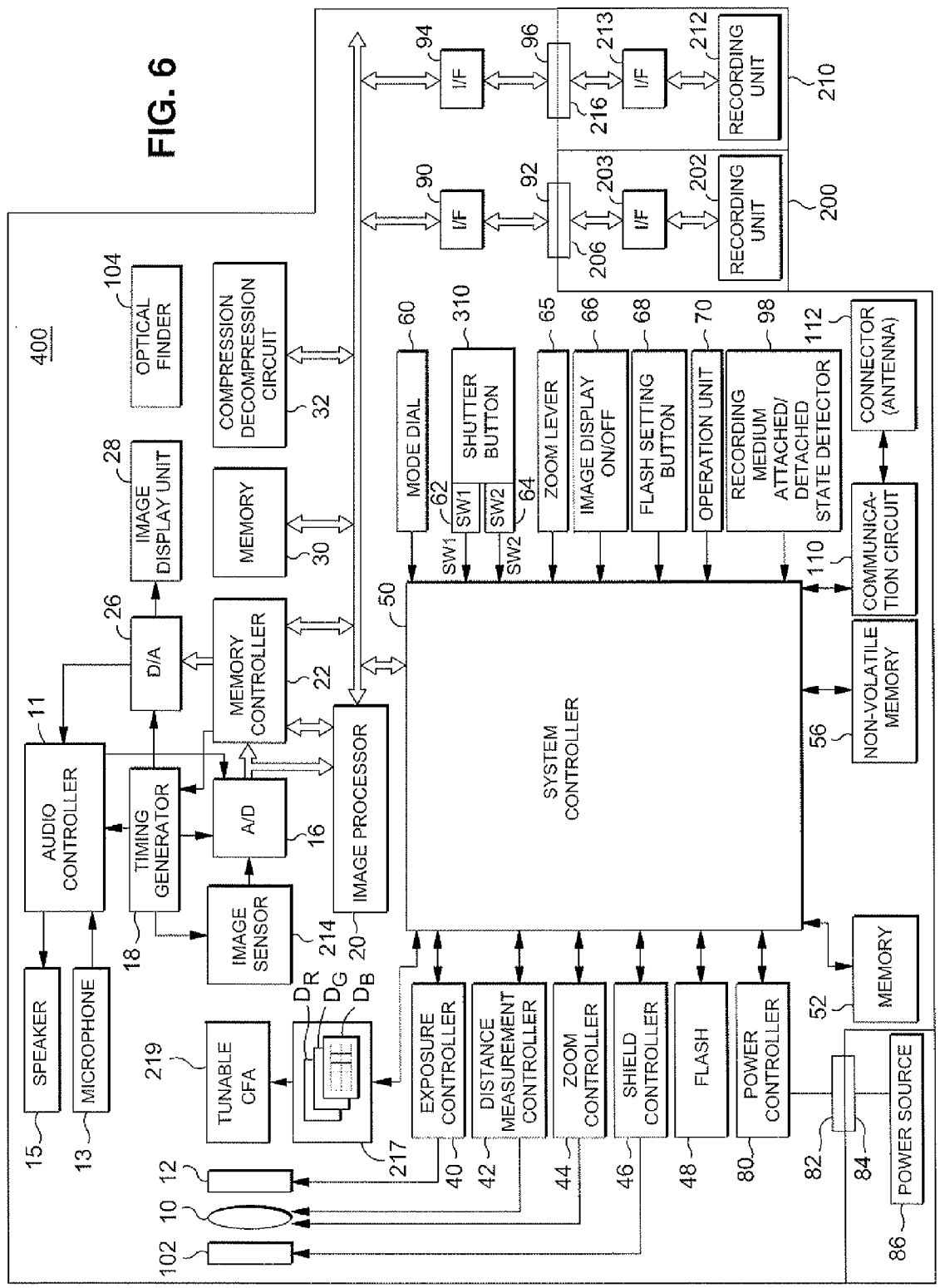
FIG. 6 is a detailed block diagram for explaining the internal architecture of an image capture device according to one example embodiment.
Figure 7:
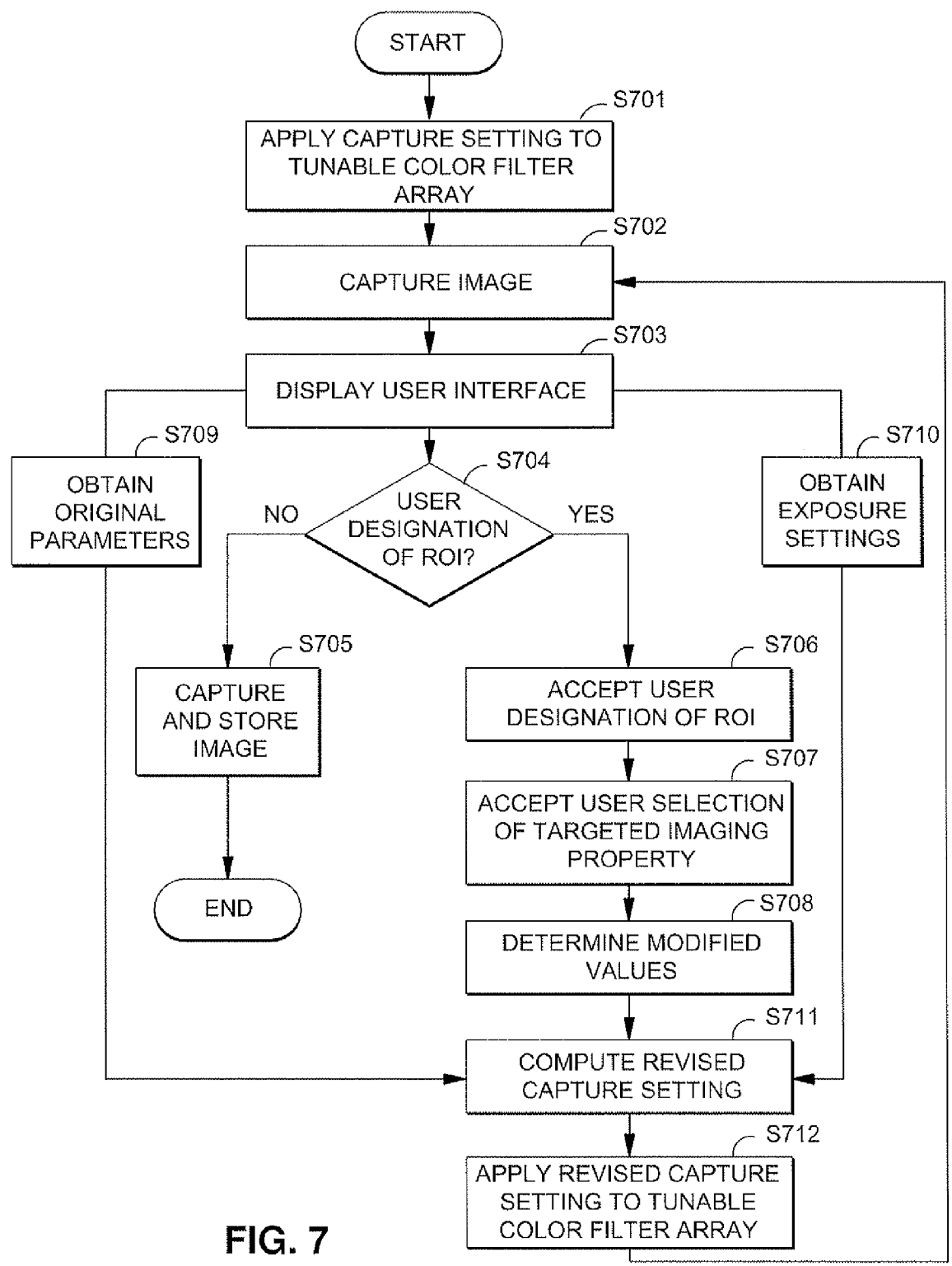
FIG. 7 is a flow diagram for explaining processing in the image capture device shown in FIG. 6 according to one example embodiment.

<FIGS. 6 and 7>

FIG. 6 is a detailed block diagram for explaining the internal architecture of an image capture device 400 according to a second example embodiment. In the embodiment of FIG. 6, parts and features that are largely similar to those of the example embodiment of FIG. 2A are illustrated with like reference numerals, and a detailed explanation thereof is omitted in the interest of brevity.

One way that the embodiment of FIG. 6 differs from the embodiment of FIG. 2A concerns the construction of the tunable imaging assembly. In the embodiment of FIG. 2A, the tunable imaging assembly includes tunable image sensor 14, perhaps in combination with optics such as lens 10. Because the image sensor 14 in the embodiment of FIG. 2A itself has a tunable spectral response, it is customary to omit a preceding color filter array, since the inclusion of any filter necessarily would decrease the signal-to-noise ratio by filtering the amount of light incident on image sensor 14.

In contrast, in the embodiment of FIG. 6, the spectral responsivity of image sensor 214 is not necessarily tunable, but rather the spectral responsivity of a preceding color filter array 219 is. Thus, in the example embodiment of FIG. 6, the tunable imaging assembly includes tunable color filter array (CFA) 219 and image sensor 214, perhaps in combination with optics such as lens 10. In the embodiment of FIG. 6, image sensor 214 is not necessarily tunable, although in other embodiments it might be.

Turning more specifically to the embodiment of FIG. 6, a light beam (light beam incident upon the angle of view of the lens) from an object in a scene that goes through the optical system (image sensing lens) 10 passes through an opening of a shutter 12 having a diaphragm function, is filtered by tunable color filter array 219, and forms an optical image of the object on the image sensing surface of image sensor 214. The image sensor 214 converts the optical image to analog image signals and outputs the signals to an A/D converter 16. The A/D converter 16 converts the analog image signal to digital image signals (image data).

In FIG. 6, an imaging assembly is comprised of tunable color filter array 219 and image sensor 214 together with associated optics, such that in some embodiments the imaging assembly is comprised of image sensor 214 preceded by color filter array 219 and lens 10.

Tunable color filter array 219 may be a spatial color filter array, such as a color filter array having a spatial distribution of a repeating pattern of filter elements. In this case, image data output from image sensor 214 is demosaiced, so as to result in output of a red-like channel for each pixel, a green-like channel for each pixel, and a blue-light channel for each pixel. Alternatively, tunable color filter array 219 might be a temporal color filter array, in which case the color filter quickly and sequentially changes spectral responsivity, with image data collected by image sensor 214 after each change.

In this case, the sequential outputs of image sensor 214 are collected so as to result in output signals for each pixel for a red-like channel, a green-like channel, and a blue-light channel.

The spectral responsivity of tunable color filter array 219 is tunable in accordance with a capture setting 217. In this embodiment, capture setting 217 may be comprised of multiple spatial masks, with one mask for each channel of information output by image sensor 214, namely, the aforementioned red-like channel, green-like channel, and blue-light channel. Thus, in this example where image sensor 214 outputs three or more channels, capture settings 217 include a spatial mask DR for the red-like channel of information, a spatial mask DG for the green-like channel of information, and a spatial mask DB for the blue-light channel of information. Each spatial mask comprises an array of control parameters applied to the tunable color filter array 219 in correspondence to pixels or regions of pixels in image sensor 214. The resulting spectral responsivity of each pixel, or each region of plural pixels, is thus tunable individually and independently of other pixels or regions of pixels, by virtue of the capture setting 217 imposed on tunable color filter array 219.

Tunable color filter array 219 may be comprised of a tunable color filter array as described in U.S. Pat. No. 6,466,961 by Miller, mentioned hereinabove. Spatial masks DR, DG and DB may correspond to voltage biases applied to control electrodes of the tunable color filter array 219.

FIG. 7 is a flow diagram for explaining processing in the image capture device 400 shown in FIG. 6 according to one example embodiment. The process steps shown in FIG. 7 are computer-executable process steps executed primarily by system controller 50 based on computer-executable process steps stored in a computer-readable memory medium such as non-volatile memory 56.

Briefly, according to FIG. 7, a default capture setting is applied to an imaging assembly such as an imaging assembly which includes a tunable color filter array preceding an image sensor for setting the spectral response of the tunable imaging assembly to a predesignated default setting. Preview image data of a scene from the imaging assembly is captured using the default capture setting. A user interface which includes a preview image based on the captured preview image data of the scene is displayed. A user designation of a ROI in the preview image is accepted, wherein the designation of the ROI is accepted via user manipulation of the user interface. A user selection of a targeted imaging property for the ROI is accepted, wherein the user selection is accepted via user manipulation of the user interface. A revised capture setting for the spectral responsivity of the tunable imaging assembly is computed, by revising the default capture setting based on the targeted imaging property for the ROI as selected by the user. The revised capture setting is applied to the tunable imaging assembly, such as by application to a tunable color filter array that precedes an image sensor, for setting the spectral response of the tunable imaging assembly to a revised setting. Image data from the imaging assembly is captured using the revised capture setting.

In more detail, the process shown in FIG. 7 starts with application of a default capture setting, then capturing an image using the default capture setting. The image is captured and displayed on the image display unit 28 by a half stroke of shutter switch (SW1) 62 before the shutter switch (SW2) 64 is switched on by a full stroke of the shutter button by a user of the image capture device 400.

As shown in FIG. 7, in step S701, a default capture setting is applied to the tunable color filter array 219 for setting the spectral response of the tunable imaging assembly to a predesignated default setting. In this embodiment, the default capture setting comprises an electronic spatial mask which individually tunes each pixel or each region of plural pixels in tunable color filter array 219, such as application of spatial masks DR, DG and DB.

In step S702, preview image data of a scene is captured using the default capture setting, according to this example embodiment. In other example embodiments, image capture device 400 automatically determines a color balance for the preview image data, and automatically derives a capture setting for the preview image data to be applied to tunable color filter array 219. In this case, preview image data of a scene is captured using the capture setting automatically derived by image capture device 400.

In step S703, a user interface which includes a preview image based on the captured preview image data of the scene is displayed, for example, as shown in FIG. 4A. In some embodiments, the user interface also includes ranges for imaging properties of the preview image, in addition to the preview image.

In step S704, it is determined whether a user has or has not designated the ROI on the displayed preview image. In this example embodiment, the ROI is designated by the user through an input via a button associated with the operation unit 70 which is then relayed to the system controller 50. In other embodiments, the user designates the ROI by contacting the region of the image displayed on the image display unit 28 where the image display unit 28 is a touch screen, or by voice command. If the user has not designated the ROI ("NO" at step S704), image data is captured using the pre-designated default setting at step S705 and the captured image data is stored in memory 30.

On the other hand, if it is determined that the user has designated the ROI ("YES" at step S704), the user designation of the ROI in the preview image is accepted at step S706, for example, as shown in FIG. 4B. In this example embodiment, when the user designates the ROI in the preview image, the pixels of the image which are included in the ROI are determined. For example, a spatial filtering algorithm is executed to determine the edges of the ROI. Alternatively, the illumination of each pixel in the preview image is determined, and pixels having substantially the same illumination are determined to be included in the ROI. Of course, any other suitable algorithms for dividing the image into regions can also be used.

In other example embodiments, the preview image is divided into regions before the user designation of the ROI is accepted. In this case, the user of the image capture device selects the quantity of regions to divide the displayed image. In some embodiments, the number of regions the image is divided into is based on the number of different illuminants associated with the scene that is captured. For example, if the displayed image includes two different illuminants, the user divides the image into two regions. In another case, the displayed image may include three different illuminants; the user may divide the image into three regions. From a practical standpoint, the user may typically divide the image between two to six regions, depending on the color balance goals of the user and the various illuminants associated with the displayed image. Additionally, the user may adjust the size of the regions relative to the image displayed.

Turning to step S707, a user selection of a targeted imaging property for the ROI is accepted, for example, as shown in FIGS. 4C to 4E. In the case that the targeted imaging property is a target range for brightness, a brightness range of the preview image data is displayed and a user manipulation of the brightness range is accepted so as to effect the selection of the target range for brightness for the ROI. In the case that the targeted imaging property is a target range for color balance, displays color channel ranges of the preview image data are displayed and a user manipulation of the color channel ranges is accepted so as to effect the selection of the target range for color balance for the ROI. With this arrangement, the user advantageously specifies the imaging property associated with a specific region of interest in the image displayed on the image display unit 28, rather than making a global adjustment to the entire image displayed on the image display unit 28. Furthermore, the user advantageously specifies the imaging property based on any suitable criteria, including, for example, a lookup table and/or aesthetic concerns.

In step S708, the modified value of the targeted imaging property for the ROI is determined, based on the user selection of the targeted imaging property in step S707. In step S709, original parameters are obtained for the designated ROI from memory 56.

In step S710, the exposure settings of image capture device 400 are obtained. In this regard, the exposure settings of image capture device 400 are the settings that are provided to exposure controller 40 to control the amount of light that will reach the image sensor 214 The exposure settings of image capture device 400 are previously determined by the image capture device 400 according to a predesignated default determined by AE processing, or alternatively are selected by a user. The exposure settings are stored in a memory, such as memory 56, and accessed in order to calculate the appropriate setting for the selected targeted imaging properties. For example, in some cases, the imaging assembly adjusts the length of exposure based on the selection of the targeted imaging properties by the user.

In step S711, a revised capture setting for the spectral responsivity of the tunable color filter array 219 is computed, by revising the default capture setting based on the targeted imaging property for the ROI as selected by the user. In this embodiment, the revised capture setting comprises an electronic spatial mask. Generally, the revised capture setting is computed based on the obtained original parameters for the designated ROI, the exposure settings of image capture device 400, and the modified values of the targeted imaging property for the ROI which are calculated from the user selection of the targeted imaging property in step S707.

More specifically, in the case that the targeted imaging property is a target range for brightness, computing the revised capture setting for the spectral responsivity of the tunable color filter array 219 comprises revising the default capture setting based on the target range for brightness for the ROI as selected by the user. In this case, the default capture setting is revised by computing a brightness change parameter based on a comparison of original brightness values in the preview image data with the target range of brightness for the ROI as selected by the user, and combining the brightness change parameter with the default capture setting so as to compute the revised capture setting. In particular, computing the brightness change parameter comprises calculating a difference between the original brightness values in the preview image data and the target range of brightness for the ROI as selected by the user. In this case, the revised capture setting comprising the electronic spatial mask is generated by associating the brightness change parameters with bias voltages for the electronic spatial mask.

In the case that the targeted imaging property is a target range for color balance, computing the revised capture setting for the spectral responsivity of the tunable color filter array 219 comprises revising the default capture setting based on the target range for color balance for the ROI as selected by the user. In this case, the default capture setting is revised by computing color change parameters based on a comparison of original color channel values in the preview image data with the target color balance for the ROI as selected by the user, and combining the color change parameters with the default capture setting so as to compute the revised capture setting. In particular, computing the color change parameters comprises calculating a difference between the original color channel values in the preview image data and the target color balance for the ROI as selected by the user. In this case, the revised capture setting comprising the electronic spatial mask is generated by associating the color change parameters with bias voltages for the electronic spatial mask.

In step S712, the revised capture setting is applied to the tunable color filter array 219 for setting the spectral response of the tunable color filter array 219 to the revised setting. Subsequently, the flow returns to step S702 where image data from the imaging assembly is captured using the revised capture setting.

After capturing image data with the revised capture setting in step S702, the user interface is displayed in step S703. At this time, the user interface includes a preview image based on the image data captured with the revised capture setting. In step S704, it is determined whether the user has or has not designated another ROI on the displayed preview image. Responsive to a determination that the user has designated another ROI ("YES" at S704), a second user selection of a targeted imaging property for the ROI is accepted, a second revised capture setting for the spectral responsivity of the tunable color filter array 219 is calculated based on the targeted imaging property for the ROI as selected by the user, and the second revised capture setting is applied to tunable color filter array 219 for setting the spectral response of the tunable imaging assembly to the second revised capture setting.

On the other hand, responsive to a determination that the user has not designated another ROI ("NO" at step S704), image data is captured using the revised capture setting, and the image data is stored. At this time, the default capture setting is applied to tunable color filter array 219, in order to return the setting of the imaging assembly to the predesignated default setting.

By virtue of this arrangement, the user typically adjusts imaging properties for a region of interest rather than globally. Furthermore, the user previews the image and adjusts the imaging properties of individual regions to achieve substantially correct or aesthetically desired color balancing, before the image data for the captured image is written onto the recording medium 200.

<other Embodiments>

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. An image capture method for use with an image capture device that includes an imaging assembly having a tunable spectral response, the method comprising:

applying a default capture setting to the tunable imaging assembly for setting the spectral response of the tunable imaging assembly to a predesignated default setting;

capturing preview image data of a scene from the tunable imaging assembly using the default capture setting;

displaying a user interface which includes one or more preview images based on the captured preview image data of the scene;

accepting a user designation of a first region of interest (ROI) in the one or more preview images, wherein the designation of the first ROI is accepted via user manipulation of the user interface;

accepting a user selection of a targeted imaging property for the first ROI, wherein the user selection is accepted via user manipulation of the user interface;

computing a first-revised capture setting for the spectral responsivity of the tunable imaging assembly by revising the default capture setting based on the targeted imaging property for the first ROI;

capturing first preview image data from the tunable imaging assembly using the first-revised capture setting;

displaying a user interface which includes a first preview image based on the first preview image data captured with the first-revised capture setting;

accepting a user designation of a second ROI in the displayed first preview image, wherein the designation of the second ROI is accepted via user manipulation of the user interface;

accepting a user selection of a targeted imaging property for the second ROI, wherein the user selection is accepted via user manipulation of the user interface;

computing a second-revised capture setting for the spectral responsivity of the tunable imaging assembly by revising the default capture setting based on the targeted imaging property for the first ROI and the targeted imaging property for the second ROI; and applying the second-revised capture setting to the tunable imaging assembly to set the spectral response of the tunable imaging assembly.

2. The image capture method according to claim 1, wherein accepting the user selection of a targeted imaging property for an ROI comprises accepting a user selection of a target range for brightness for the ROI; and wherein computing a revised capture setting for the spectral responsivity of the tunable imaging assembly comprises revising the default capture setting based on the target range for brightness for the ROI as selected by the user.

3. The image capture method according to claim 2, wherein computing the revised capture setting comprises:

computing a brightness change parameter based on a comparison of original brightness values in the preview image data with the target range of brightness for the ROI as selected by the user; and combining the brightness change parameter with the default capture setting so as to compute the revised capture setting.

4. The image capture method according to claim 3, wherein computing the brightness change parameter comprises calculating a difference between the original brightness values in the preview image data and the target range of brightness for the ROI as selected by the user.

5. The image capture method according to claim 2, wherein accepting the selection of the target range for brightness comprises:

displaying on the user interface a brightness range of the preview image data; and accepting a user manipulation of the brightness range so as to effect the selection of the target range for brightness for the ROI.

6. The image capture method according to claim 5, wherein the brightness range of the preview image data is displayed on the user interface as a brightness histogram.

7. The image capture method according to claim 1, wherein accepting the user selection of a targeted imaging property for an ROI comprises accepting a user selection of a target range for color balance for the ROI; and wherein computing a revised capture setting for the spectral responsivity of the tunable imaging assembly comprises revising the default capture setting based on the target range for color balance for the ROI as selected by the user.

8. The image capture method according to claim 7, wherein computing the revised capture setting comprises:

computing color change parameters based on a comparison of original color channel values in the preview image data with the target color balance for the ROI as selected by the user; and combining the color change parameters with the default capture setting so as to compute the revised capture setting.

9. The image capture method according to claim 8, wherein computing the color change parameters comprises calculating a difference between the original color channel values in the preview image data and the target color balance for the ROI as selected by the user.

10. The image capture method according to claim 7, wherein accepting the user selection of the target range for color balance comprises:

displaying on the user interface color channel ranges of the preview image data; and accepting a user manipulation of the color channel ranges so as to effect the selection of the target range for color balance for the ROI.

11. The image capture method according to claim 10, wherein the color channel ranges of the preview image data are displayed on the user interface as color channel histograms.

12. The image capture method according to claim 1, wherein the default capture setting and the revised capture setting both comprise an electronic spatial mask, and wherein the revised capture setting comprises an electronic spatial mask with differing spectral responsivity settings in different regions of the mask.

13. The image capture method according to claim 1, wherein the tunable imaging assembly comprises an image sensor which has a tunable spectral response.

14. The image capture method according to claim 1, wherein the tunable imaging assembly comprises an image sensor and a preceding color filter array which has a tunable spectral response.

15. An image capture device that includes an imaging assembly having a tunable spectral response comprising:

a computer-readable memory constructed to store a computer-executable process; and a processor constructed to execute the computer-executable process stored in the memory;

wherein the process stored in the memory includes to:

apply a default capture setting to the tunable imaging assembly for setting the spectral response of the tunable imaging assembly to a predesignated default setting;

capture preview image data of a scene from the imaging assembly using the default capture setting;

display a user interface which includes one or more preview images based on the captured preview image data of the scene;

accept a user designation of a first region of interest (ROI) in the one or more preview images, wherein the designation of the first ROI is accepted via user manipulation of the user interface;

accept a user selection of a targeted imaging property for the first ROI, wherein the user selection is accepted via user manipulation of the user interface;

compute a first-revised capture setting for the spectral responsivity of the tunable imaging assembly based on the default capture setting and the targeted imaging property for the first ROI;

capture first preview image data from the tunable imaging assembly using the first-revised capture setting;

display a user interface which includes a first preview image based on the first preview image data captured with the first-revised capture setting;

accept a user designation of a second region of interest (ROI) in the displayed first preview image, wherein the designation of the second ROI is accepted via user manipulation of the user interface;

accept a user selection of a targeted imaging property for the second ROI, wherein the user selection is accepted via user manipulation of the user interface;

compute a second-revised capture setting for the spectral responsivity of the tunable imaging assembly based on the default capture setting, the targeted imaging property for the first ROI and the targeted imaging property for the second ROI as selected by the user; and apply the second-revised capture setting to the tunable imaging assembly to set the spectral response of the tunable imaging assembly.

16. The image capture device according to claim 15, wherein accepting the user selection of a targeted imaging property for an ROI comprises accepting a user selection of a target range for brightness for the ROI; and wherein computing a revised capture setting for the spectral responsivity of the tunable imaging assembly comprises revising the default capture setting based on the target range for brightness for the ROI as selected by the user.

17. The image capture device according to claim 16, wherein computing the revised capture setting comprises:

computing a brightness change parameter based on a comparison of original brightness values in the preview image data with the target range of brightness for the ROI as selected by the user; and combining the brightness change parameter with the default capture setting so as to compute the revised capture setting.

18. The image capture device according to claim 17, wherein computing the brightness change parameter comprises calculating a difference between the original brightness values in the preview image data and the target range of brightness for the ROI as selected by the user.

19. The image capture device according to claim 16, wherein accepting the selection of the target range for brightness comprises:

displaying on the user interface a brightness range of the preview image data; and accepting a user manipulation of the brightness range so as to effect the selection of the target range for brightness for the ROI.

20. The image capture device according to claim 19, wherein the brightness range of the preview image data is displayed on the user interface as a brightness histogram.

21. The image capture device according to claim 15, wherein accepting the user selection of a targeted imaging property for an ROI comprises accepting a user selection of a target range for color balance for the ROI; and wherein computing a revised capture setting for the spectral responsivity of the tunable imaging assembly comprises revising the default capture setting based on the target range for color balance for the ROI as selected by the user.

22. The image capture device according to claim 21, wherein computing the revised capture setting comprises:

computing color change parameters based on a comparison of original color channel values in the preview image data with the target color balance for the ROI as selected by the user; and combining the color change parameters with the default capture setting so as to compute the revised capture setting.

23. The image capture device according to claim 22, wherein computing the color change parameters comprises calculating a difference between the original color channel values in the preview image data and the target color balance for the ROI as selected by the user.

24. The image capture device according to claim 21, wherein accepting the user selection of the target range for color balance comprises:

displaying on the user interface color channel ranges of the preview image data; and accepting a user manipulation of the color channel ranges so as to effect the selection of the target range for color balance for the ROI.

25. The image capture device according to claim 24, wherein the color channel ranges of the preview image data are displayed on the user interface as color channel histograms.

26. The image capture device according to claim 15, wherein the default capture setting and the revised capture setting both comprise an electronic spatial mask, and wherein the revised capture setting comprises an electronic spatial mask with differing spectral responsivity settings in different regions of the mask.

27. The image capture device according to claim 15, wherein the tunable imaging assembly comprises an image sensor which has a tunable spectral response.

28. The image capture device according to claim 15, wherein the tunable imaging assembly comprises an image sensor and a preceding color filter array which has a tunable spectral response.

29. A non-transitory computer-readable storage medium on which is stored instructions for computer-executable operations for causing a computer to perform an image capture method for use with an image capture device that includes an imaging assembly having a tunable spectral response, the operations comprising:

applying a default capture setting to the tunable imaging assembly for setting the spectral response of the tunable imaging assembly to a predesignated default setting;

capturing preview image data of a scene from the imaging assembly using the default capture setting;

displaying a user interface which includes one or more preview images based on the captured preview image data of the scene;

accepting a user designation of a first region of interest (ROI) in the one or more preview images, wherein the designation of the first ROI is accepted via user manipulation of the user interface;

accepting a user selection of a targeted imaging property for the first ROI, wherein the user selection is accepted via user manipulation of the user interface;

computing a first-revised capture setting for the spectral responsivity of the tunable imaging assembly by revising the default capture setting based on the targeted imaging property for the first ROI;

capturing first preview image data from the tunable imaging assembly using the first-revised capture setting;

displaying a user interface which includes a first preview image based on the first preview image data captured with the first revised capture setting;

accepting a user designation of a second ROI in the displayed first preview image, wherein the designation of the second ROI is accepted via user manipulation of the user interface;

accepting a user selection of a targeted imaging property for the second ROI, wherein the user selection is accepted via user manipulation of the user interface;

computing a second-revised capture setting for the spectral responsivity of the tunable imaging assembly by revising the default capture setting based on the targeted imaging property for the first ROI and the targeted imaging property for the second ROI as selected by the user; and applying the second-revised capture setting to the tunable imaging assembly to set the spectral response of the tunable imaging assembly.

30. The non-transitory computer-readable storage medium according to claim 29, wherein accepting the user selection of the targeted imaging property for an ROI comprises accepting a user selection of a target range for brightness for the ROI; and wherein computing a revised capture setting for the spectral responsivity of the tunable imaging assembly comprises revising the default capture setting based on the target range for brightness for the ROI as selected by the user.

31. The non-transitory computer-readable storage medium according to claim 30, wherein computing the revised capture setting comprises:

computing a brightness change parameter based on a comparison of original brightness values in the preview image data with the target range of brightness for the ROI as selected by the user; and combining the brightness change parameter with the default capture setting so as to compute the revised capture setting.

32. The non-transitory computer-readable storage medium according to claim 31, wherein computing the brightness change parameter comprises calculating a difference between the original brightness values in the preview image data and the target range of brightness for the ROI as selected by the user.

33. The non-transitory computer-readable storage medium according to claim 30, wherein accepting the selection of the target range for brightness comprises:

displaying on the user interface a brightness range of the preview image data; and accepting a user manipulation of the brightness range so as to effect the selection of the target range for brightness for the ROI.

34. The non-transitory computer-readable storage medium according to claim 33, wherein the brightness range of the preview image data is displayed on the user interface as a brightness histogram.

35. The non-transitory computer-readable storage medium according to claim 29, wherein accepting the user selection of a targeted imaging property for an ROI comprises accepting a user selection of a target range for color balance for the ROI; and wherein computing a revised capture setting for the spectral responsivity of the tunable imaging assembly comprises revising the default capture setting based on the target range for color balance for the ROI as selected by the user.

36. The non-transitory computer-readable storage medium according to claim 35, wherein computing the revised capture setting comprises:

computing color change parameters based on a comparison of original color channel values in the preview image data with the target color balance for the ROI as selected by the user; and combining the color change parameters with the default capture setting so as to compute the revised capture setting.

37. The non-transitory computer-readable storage medium according to claim 36, computing the color change parameters comprises calculating a difference between the original color channel values in the preview image data and the target color balance for the ROI as selected by the user.

38. The non-transitory computer-readable storage medium according to claim 35, wherein accepting the user selection of the target range for color balance comprises:

displaying on the user interface color channel ranges of the preview image data; and accepting a user manipulation of the color channel ranges so as to effect the selection of the target range for color balance for the ROI.

39. The non-transitory computer-readable storage medium according to claim 38, wherein the color channel ranges of the preview image data are displayed on the user interface as color channel histograms.

40. The non-transitory computer-readable storage medium according to claim 29, wherein the default capture setting and the revised capture setting both comprise an electronic spatial mask, and wherein the revised capture setting comprises an electronic spatial mask with differing spectral responsivity settings in different regions of the mask.

41. The non-transitory computer-readable storage medium according to claim 29, wherein the tunable imaging assembly comprises an image sensor which has a tunable spectral response.

42. The non-transitory computer-readable storage medium according to claim 29, wherein the tunable imaging assembly comprises an image sensor and a preceding color filter array which has a tunable spectral response.

* * * * *